3,226,351
POLYETHYLENE OF IMPROVED CLARITY
Frank X. Werber, Rockville, and Razmic S. Gregorian, Silver Spring, Md., assignors to W. R. Grace & Co., a corporation of Connecticut
No Drawing. Filed Dec. 10, 1962, Ser. No. 243,589
19 Claims. (Cl. 260—29.6)

This invention relates to a method of preparing a polyethylene product. More particularly this invention is directed to producing a polyethylene composition of improved clarity without substantially affecting its flow properties.

Polymers of ethylene such as those described in Belgian 533,362 issued to K. Ziegler and in U.S. 2,816,883, issued to Larchar et al., are well known in the art today and are generally characterized by their organic solvent solubility and thermoplastic or bow properties. Polyethylenes produced in accordance with the aforesaid patent references are herein considered to be high density polyethylene, i.e., having a density in the range 0.94–0.98.

The advent of high density polyethylene introduced many problems in the commercial field. For instance, in comparison with conventional low density polyethylene (0.92) as described in U.S. 2,153,553 issued to E. Fawcett et al., high density polyethylene has an inferior clarity.

Lately, several methods have been tried to increase the clarity of high density polyethylene to foster their commercial acceptability in fields, e.g. films, coatings, etc., wherein clarity is a requisite. The art has discovered that crosslinking of high density polyethylene improves the clarity thereof, and various methods have been employed in this direction. Such methods include crosslinking by irradiation and also by chemical reaction using, e.g., peroxides, diperoxides, hydroperoxides or azo-compounds as crosslinking agents, followed by subjecting the polymer to a curing step at elevated temperatures in order to obtain uniform crosslinking and improved clarity. However, it must be mentioned that the aforesaid crosslinking methods to improve clarity have the drawback that processing operations subsequent to crosslinking such as extrusion, molding, or the like to put the crosslinked polymer in the form of a shaped article to be passed on to the general public can only, if at all, be performed with the greatest difficulty. This is so because the substantially uniform crosslinking throughout the polymeric material greatly decreases the flow properties of the material to the point whereat the material is mainly thermoset instead of thermoplastic. Therefore, it is necessary in most cases to carry out all operations necessary to put the polymeric material in its final form, e.g. extrusion, molding, etc., before subjecting it to a crosslinking and curing operation to obtain improved clarity. Such a procedure is unworkable in the commercial field since small retailers who are equipped to perform only the necessary extrusion, molding, and similar operations cannot afford nor possess the know-how to perform subsequent crosslinking operations by irradiation or otherwise. Additionally, the cost of returning the uncrosslinked shaped article to the polymer manufacturer for improved clarity by crosslinking and curing would be prohibitive. Thus, a method to produce a polyethylene, and especially high density polyethylene and blends of high and low density polyethylene having improved clarity properties and which because of their flow properties can be subjected to subsequent shaping operations is a desideratum.

Thus, one object of the instant invention is to provide a method of improving the clarity of high density polyethylene without effecting its flow properties. Other objects will become apparent from a reading hereinafter.

Summarily the invention is directed to a process for producing a processable polyethylene composition of improved clarity which comprises blending polyethylene having a density in the range 0.94 to 0.98 at a temperature above its softening point with a minor amount, 0.001 to 1% by weight of said polyethylene of an aluminum-containing additive of the formula,

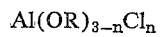

$$Al(OR)_{3-n}Cl_n$$

wherein R is member of the group consisting of hydrogen and an alkyl, said alkyl containing 1 to 16 carbon atoms and $n$ is an integer from 0 to 1.

In addition to the aluminum containing additive, it has also been found that adding water to the molten mixture to increase the humidity in the mixing chamber improves the clarity of the resultant polymer even more than merely adding the aluminum additive per se, The reason for the improvement in clarity upon the addition of water to the polymer-aluminum containing additive mix is not known. However, that such improvement occurs will be shown by the examples herein after. Since water has poor solubility in polyethylene and volatilizes readily in the blending temperature range of the molten polymer, a large excess of water is added to the molten polymer to insure diffusion into the polymer. Amounts of water in the range from 1 to 300% by weight of the polymer are added to the molten polymer composition. Steam may also be substituted for water in practicing this invention. It is critical that the aluminum containing additive be present when water or steam is added to the molten polymer or the improvement in clarity is absent.

Operable aluminum-containing additives include but are not limited to aluminum hydroxide, aluminum trimethoxide, aluminum triethoxide, aluminum tri-n-propoxide, aluminum tri-n-butoxide, aluminum tri-sec-butoxide, aluminum triisobutoxide, aluminum tridecoxide, aluminum tridodecoxide, aluminum hexadecoxide, aluminum chlorodiisopropoxide, aluminum chloro-diethoxide and the like.

In practicing the invention, it is possible to admix the aluminum additive with the polyethylene at temperatures whereat the polymer is a solid, e.g. room temperature, and thereafter heat the admixture above the softening point of the polyethylene. Preferably, however, the additive is added when the polymer is in a molten state.

Admixture of the additive and the molten polymer is performed at a temperature in the range 130 to 200° C. The mixing step can be performed in any conventional mixer such as a Brabender Plastograph, a Banbury mill and the like. It is also possible to feed the additive and the polyethylene at preset rates into the hopper of an extruder and accomplish the blending in the heated barrel thereof immediately preceding the shaping operation.

For ease of handling the additive is usually added in solution with a hydrocarbon solvent. Any hydrocarbon solvent, e.g. benzene, for the aluminum additive which flashes off at the blending temperature is operable. Choice of such solvents would be obvious to one skilled in the art.

The following examples will aid in explaining but are expressly deemed not to limit the invention. Unless otherwise noted all parts and percentages are by weight herein.

Densities of the polyethylene were measured under the conditions specified in ASTMD 1505–57T.

Throughout the invention the melt indices (MI) were measured under the conditions specified in ASTMD 1238–52T. The melt index of the polyethylene can be varied over a broad range within which the material is workable in processing or shaping operations. For any given MI, improvement in clarity is obtained by the practice of this invention.

The clarity test devised specifically for evaluation of changes in the clarity of the polyethylene composition consists of viewing, through a ½" diameter hole centered in a horizontal sample table holding clarity test samples thereon, a glowing filament from a 2-watt concentrated arc lamp (Sylvania C2/DC point light source), the extreme tip of said filament being situated 3 inches below the bottom surface of said test sample. The clarity test samples are prepared by molding under 10,000 lbs. pressure at 350° F. and then air cooling to room temperature for unquenched samples or immersing in a $H_2O$ bath at room temperature for quenched samples. The results of the clarity test are expressed in terms of the clarity number (mils) which is defined as the maximum thickness of the sample in mills through which the glowing filament, as viewed from 1 foot above the sample table, can still be observed.

EXAMPLE 1

28 gms. of commercially available polyethylene having a density of 0.960 and a melt index of 5.0 were charged to a Brabender Plastograph and milled until molten at a temperature of 164° C. 0.28 gm. of aluminum isopropoxide in a benzene solution were added to the molten polymer and milling was continued for an additional 10 minutes. The admixed polymer was removed from the Brabender and cooled. Two samples, approximately 2 gms. each, of the admixed polymer were pressed into approximately 5 mil thick film in a platen press at 350° F. and 20,000 p.s.i. for 3 minutes. One of the pressed samples was immediately quenched in a water bath at 25° C. and the other pressed sample was air cooled, i.e. unquenched. Using the clarity test mentioned supra, the unquenched sample had a clarity number of 7–14 mils and the quenched sample has a clarity number of 32–37 mils. The melt index of both the quench and unquenched sample was 5.0.

In a control run, 28 gms. of commercially available polyethylene having a density of 0.960 and a melt index of 5.0 were charged to a Bradender Plastograph and milled under the same conditions as the blended product in this example. After being pressed under the same conditions as the blended product of this example, the product from the control run had a clarity number of less than 7 mils unquenched, and 10–15 mils quenched.

A comparison of the clarity numbers of the blended sample with the control sample shows that the clarity of the blended sample improved by a factor of 2 in the unquenched state and more than 2 in the quenched state.

EXAMPLE 2

The procedure and reactants were the same as in Example 1 except that only 0.14 gm. of aluminum isopropoxide in a benzene solution was added to the molten polyethylene. The quenched sample had a clarity number of 35–41 mils and the unquenched sample had a clarity number of 5–10 mils. Both samples had a melt index of 5.0

The following examples in Table I show the effect of concentration of the aluminum-containing additive on the clarity of the polymer. In addition, when the aluminum-containing additive concentration is held constant, the effect of adding water in varying amounts on the clarity of the polyethylene is noted. In all examples in Table I, the procedure was the same as that set down in Example 1. In examples in Table I wherein water is added, said addition is made after the aluminum-containing additive is admixed with the polymer for 10 minutes. Following the addition of water to the Brabender, milling is continued for an additional 10 minutes.

*Table I*

| Example No. | Polymer [1] (gms.) | Aluminum Additive [2] (gms.) | Water Added (cc.) | Milling Temp. (°C.) | Clarity Number [3] | | Melt Index |
|---|---|---|---|---|---|---|---|
| | | | | | Quenched (mils) | Unquenched (mils) | |
| 3 | 30.0 | 0.015 | | 164 | 78–84 | 5–11 | 0.07 |
| 4 | 30.0 | 0.15 | | 164 | 63–68 | 15–21 | 0.07 |
| 5 | 30.0 | 0.30 | | 164 | 29–35 | 13–19 | 0.07 |
| 6 | 30.0 | 0.30 | 1.0 | 164 | 56–62 | 9–15 | 0.07 |
| 7 | 30.0 | 0.30 | 5.0 | 164 | 61–67 | 15–20 | 0.07 |
| 8 | 30.0 | 0.30 | 10.0 | 164 | 65–72 | 18–23 | 0.07 |
| 9 | 30.0 | 0.030 | 100.0 | 164 | 110–116 | 37–45 | 0.07 |
| 10 | [4] 30.0 | | | 164 | 26–32 | 13 | 0.07 |

[1] Commercially available polyethylene (density 0.96; melt index 0.07).
[2] Aluminum isopropoxide in a benzene solution.
[3] Measured by clarity test referred to herein.
[4] Control—Commercially available polyethylene (density 0.96; melt index 0.07) milled in Brabender for 20 minutes at 164° C.

As can be seen in Table I, the improvement in clarity increases as the amount of aluminum-containing additive present decreases within the limits disclosed herein, see Examples 3–5. It should also be noted that at any given aluminum-containing additive concentration, an increase in the amount of water added to the mixture within the limits disclosed herein, increases the clarity of the polymer. See Examples 6 through 8.

The following examples in Table II show various aluminum-containing additives operable in practicing this invention. The procedure for admixing, pressing and measuring clarity in the examples in Table II was the same as that disclosed in Example 1 except that only quenched samples were measured for clarity by the clarity test.

Table II

| Example No. | Polymer¹ (gms.) | Aluminum Additive² | Aluminum Additive (gms.) | Milling Temp. (°C.) | Clarity Number³ Quenched Sample (mils) | Melt Index |
|---|---|---|---|---|---|---|
| 11 | 28.0 | Aluminum hydroxide | 0.14 | 175 | 28-34 | 5.0 |
| 12 | 28.0 | Aluminum tri-sec-butoxide | 0.28 | 175 | 23-29 | 5.0 |
| 13 | 28.0 | Aluminum chlorodiisopropoxide | 0.28 | 175 | 16-21 | 5.0 |
| 14 | 28.0 | Aluminum triisopentoxide | 0.28 | 175 | 29-34 | 5.0 |
| 15 | 28.0 | Aluminum trihexadecoxide | 0.28 | 175 | 24-29 | 5.0 |
| 16 | ⁴28.0 | | | 175 | 10-15 | 5.0 |

¹ Commercially available polyethylene (density 0.96; melt index 5.0).
² Aluminum additive milled 5 minutes after addition to Brabender Plastograph.
³ Measured by clarity test referred to herein.
⁴ Control—commercially available polyethylene (density 0.96; melt index 5.0) milled in Brabender for 10 minutes at 175° C.

EXAMPLE 17

38 gms. of commercially available polyethylene having a density of 0.960 and a melt index of 5.0 were charged to a Brabender Plastograph and milled until molten at a temperature of 168° C. 0.38 gms. of aluminum capryloxide was added to the molten polymer and milling was continued for 15 minutes. The admixed polymer was removed from the Brabender and cooled. The samples of the admixed polymer were pressed into approximately 20 mil thick film in a platen press at 350° F. and approximately 20,000 p.s.i. for 3 minutes. One of the pressed samples was immediately quenched in a water bath at 25° C. and the other sample was cooled in air, unquenched. The quenched sample on observation showed a definite improvement in clarity, and a slight improvement in clarity was noticed for the air-cooled sample.

The polymer composition resulting from the practice of this invention has many and various uses. It is especially useful in products wherein clarity is important. Such useful products include film, pipe, filaments, coating and the like.

We claim:

1. A composition of matter useful in the production of processable polyethylene of improved clarity consisting essentially of linear polyethylene having a density in the range 0.94 to 0.98 and a minor amount, 0.001 to 1.0% by weight of said polyethylene of an aluminum-containing additive of the formula $$Al(OR)_{3-n}Cl_n$$

wherein R is a member of the group consisting of hydrogen and an alkyl, said alkyl containing 1 to 16 carbon atoms an $n$ is an integer from 0 to 1.

2. A composition of matter useful in the production of processable polyethylene of improved clarity consisting essentially of (A) linear polyethylene having a density in the range 0.940 to 0.980 (B) 0.001 to 1.0% by weight of said polyethylene of an aluminum-containing additive of the formula $$Al(OR)_{3-n}Cl_n$$

wherein R is a member of the group consisting of hydrogen and an alkyl, said alkyl containing 1 to 16 carbon atoms and $n$ is an integer from 0 to 1 and (C) water in an amount equal to 1 to 300% by weight of said polyethylene.

3. The composition according to claim 1 wherein the additive is aluminum isopropoxide.

4. The composition according to claim 1 wherein the additive is aluminum chlorodiisopropoxide.

5. The composition according to claim 1 wherein the additive is aluminum hydroxide.

6. The composition according to claim 2 wherein the aluminum-containing additive is aluminum isopropoxide.

7. The composition according to claim 2 wherein the aluminum-containing additive is aluminum hydroxide.

8. The composition according to claim 2 wherein the aluminum containing additive is aluminum capryloxide.

9. The composition according to claim 2 wherein the the aluminum-containing additive is aluminum chlorodiisopropoxide.

10. The composition according to claim 2 wherein the aluminum-containing additive is aluminum triisopentoxide.

11. The composition according to claim 2 wherein the aluminum-containing additive is aluminum trihexadecoxide.

12. A process for producing a processable polyethylene composition of improved clarity which comprises blending linear polyethylene having a density in the range 0.94–0.98 at a temperature above its melting point with a minor amount, 0.001 to 1.0% by weight of said polyethylene of an aluminum-containing additive of the formula $$Al(OR)_{3-n}Cl_n$$

wherein R is a member of the group consisting of hydrogen and alkyl, said alkyl containing 1 to 16 carbon atoms and $n$ is an integer from 0 to 1.

13. A process for producing a processable polyethylene composition of improved clarity which comprises blending polyethylene having a density in the range 0.94 to 0.980 at a temperature above its melting point with 0.001 to 1.0% by weight of said polyethylene of an aluminum-containing additive of the formula $$Al(OR)_{3-n}Cl_n$$

wherein R is a member of the group consisting of hydrogen and an alkyl containing 1–16 carbon atoms and $n$ is an integer from 0 to 1 and water in an amount equal to 1 to 300% by weight of said polyethylene.

14. The process according to claim 12 wherein the additive is aluminum isopropoxide.

15. The process according to claim 12 wherein the additive is aluminum hydroxide.

16. The process according to claim 13 wherein the aluminum-containing additive is aluminum isopropoxide.

17. The process according to claim 13 wherein the aluminum-containing additive is aluminum hydroxide.

18. The process according to claim 13 wherein the additive is aluminum chloridiisopropoxide.

19. The process according to claim 13 wherein the additive is aluminum trihexadecoxide.

References Cited by the Examiner
UNITED STATES PATENTS 2,990,389  6/1961  Frump _____ 260—29.6
3,175,996  3/1965  Gregorian et al. _____ 260—93.7

MURRAY TILLMAN, Primary Examiner.

WILBUR J. BASCOMB, Assistant Examiner.